United States Patent [19]
Brewer

[11] 3,762,655
[45] Oct. 2, 1973

[54] SHEARING MECHANISM
[75] Inventor: John C. Brewer, Salt Lake City, Utah
[73] Assignee: Garbalizer Corporation of America, Salt Lake City, Utah
[22] Filed: Jan. 3, 1972
[21] Appl. No.: 214,985

[52] U.S. Cl. .................................. 241/32, 64/28
[51] Int. Cl. ........................................ B02c 23/04
[58] Field of Search ..................... 241/32; 64/28 R; 192/150

[56] References Cited
UNITED STATES PATENTS
| | | | |
|---|---|---|---|
| 2,869,793 | 1/1959 | Montgomery | 241/32 X |
| 2,307,556 | 1/1943 | Wileman | 64/28 R |
| 1,363,270 | 12/1920 | Rennerfelt | 241/32 |

Primary Examiner—Granville Y. Custer, Jr.
Attorney—M. Ralph Shaffer

[57] ABSTRACT

Improved, shaft driven, shearing structure having shear pin means so positioned as to minimize down-time servicing, and expense of maintenance in the event of shear overload. Specifically, a shaft is provided with a hub mounting a blade structure thereto. The blade structure, hub and shaft are provided with mutually aligned apertures to constitute a through bore dimensioned to receive a shear pin structure at at least one and preferably both extremities. In the event of shear pin breakage, the affected shear pin or pins may be removed and subsequent ones installed, with such subsequent ones thrusting pieces of former pin centrally such that the through bore at the shaft area will store these pieces. After usage of subsequently emplaced shear pins in multiple numbers, then the broken shear pin pieces may be removed simply by a punch out or press out operation. Adjustment structure is likewise provided for appropriate bearing wear monitoring and replacement.

9 Claims, 6 Drawing Figures

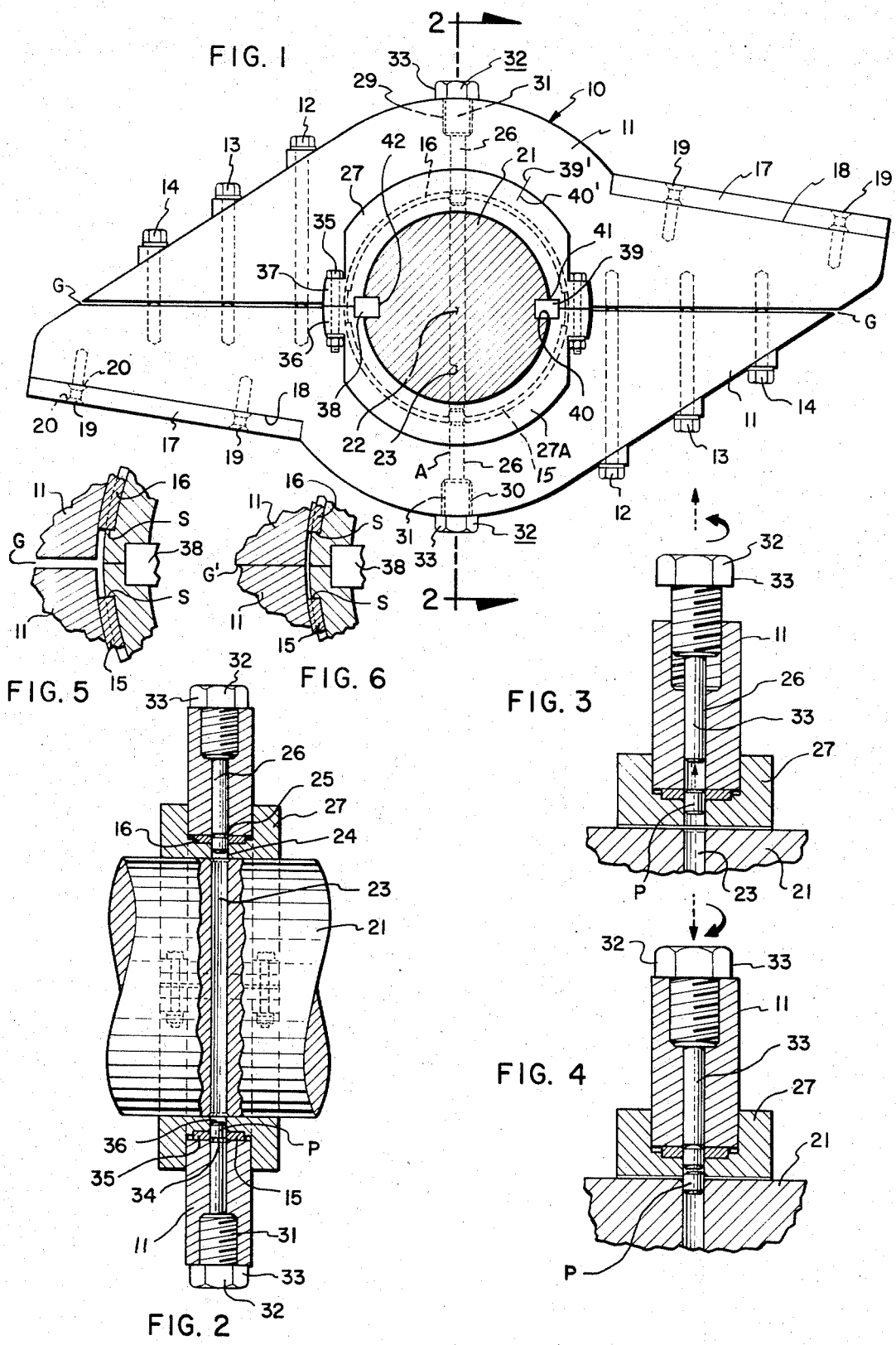

SHEARING MECHANISM

The present invention relates to shearing mechanisms and, more particularly, to a new and improved shearing mechanism insuring a minimum of down-time and maintenance costs upon malfunction.

For a single or multiple blade shearing structure, there is ever present the problem of blade maintenance, specifically re-keying the blade structure to the shaft in the event of overload during a shearing operation. Customarily, shearing blades may be provided with a keyed connection or pin connection to a revolving shaft, with the key or pin being designed for breakage in the event a hardened object becomes stuck between the cutting portion of the blade and its cooperating cutter bar.

Once a key or pin is sheared so as to allow the shaft freely to revolve within its blade structure, then there is the problem of re-keying the blade to the shaft. This is generally a time-consuming operation, particularly when multiple blades are used. One difficulty centers from the fact that the blade must be completely removed from the shaft in order for pin segments to be tapped out and new pin structure installed. This presents quite a feat, particularly when it is understood that the shaft will normally have to be removed from the cutter bars in order to "get at" the blade structure.

In the present invention the revolving drive shaft is itself provided with a transverse aperture serving as a storage cavity for successive portions of sheared off ends of shear pins as results through shearing blade failure. Thus, one and preferably two diametrically opposed pins are utilized at opposite ends of a through bore, relative to the shearing blade structure, hub upon which the same is mounted, and the shaft, so that in the event of pin shear the shear pins can be immediately replaced by new pins, the ends of the new pins thrusting the broken pin portion inwardly into the shaft bore area so that these ends, at this point, will not have to be tapped out. Subsequently, after five or six shear pin breakages, then the accumulated shear pin ends of pins previously broken, i.e., sheared, can be simply thrust out by a hard, elongate metal object, such as a thin diameter punch.

As to shaft mounting and blade structure, there is preferably certain spacing provided such that as bushing wear proceeds, the structure can be tightened out until a close fit is approximated. At this point the user knows that the bearing halves must likewise be replaced.

Suitable alignment and other structure is provided to facilitate new shear pin installation.

Accordingly, the principal object of the present invention is to provide a new and improved shearing mechanism.

An additional object is to provide improved shear pin structure for shearing mechanisms.

An additional object is to provide for central shaft storage of broken shear pin ends, such that these ends do not have to be separated from the structure prior to the introduction of new shear pin means.

A further object is to provide for bearing positionment, monitoring, and replacement in connection with revolving structures.

A further object is to provide for new and improved shear pin structure associated with revolving means.

The features of the present invention which are believed to be novel are set forth with particularity in the appended claims. The present invention, both as to its organization and manner of operation, together with further objects and advantages thereof, may best be understood by reference to the following description, taken in connection with the accompanying drawings in which:

FIG. 1 is an elevation, shown partially in section, of shearing blade structure mounted upon a shaft in accordance with the principles of the present invention.

FIG. 2 is an enlarged section taken along the line 2—2 in FIG. 1.

FIG. 3 is an enlarged, fragmentary section similar to the upper portion of FIG. 2, and illustrates the manner in which a respective shear pin element is removed from its position in the blade structure, subsequent to shear pin breakage.

FIG. 4 is similar to FIG. 3 and illustrates a new shear pin element being installed in lieu of the old shear pin element of FIG. 3 which has been removed.

FIG. 5 is an enlarged, fragmentary detail illustrating the structure by which the shearing blade assembly is journaled by bearing segments to the split hub construction of FIG. 1.

FIG. 6 is similar to FIG. 5 but illustrates shearing blade mechanism closure when the bearing segments have become worn, this further indicating that such bearing or bushing segments must be replaced.

In connection with the below described invention, it will be observed that the same represents a modification over an improvement upon the inventor's co-pending United States Patent Application entitled "CUTTING AND SHEARING MECHANISM AND IMPROVEMENTS THEREIN," Ser. No. 130,338, filed Apr. 1, 1971, which application is incorporated herein fully by way of reference.

In FIG. 1, shearing blade means 10 includes a pair of opposite shearing blade halves 11 which are mutually secured together by securement bolts 12, 13 and 14. When bushing halves 15 and 16 of FIG. 5, hereinafter described, become worn, then the gap G, seen in FIGS. 1 and 5, closes as shown at G', this indicating that new bushing halves need to be installed in lieu of the worn ones.

In returning to a consideration of the shearing blade means, see FIG. 1, it is seen that a pair of hardened steel blade segments 17 are secured to edges or seats 18 of each of the respective shearing blade halves, such securement being accomplished by counter-sunk or counter-bore machine screws 19. Segment counter-bore or counter-sink areas 20 may be provided so that the blade segments can be reversed.

Shaft 21 has a central axis of revolvement 22, likewise a transverse, normal, through-aperture 23, as seen in FIGS. 1 and 2. This aperture aligns with apertures 24, 25 and 26 of hub half 27, bushing segment 16, and shearing blade half 11. A like construction is found on the opposite side of the structure relative to the remaining shearing blade half 11. Accordingly, there is a through-bore A, see FIG. 1, which proceeds completely through the opposite blade halves 11, the opposite hub halves 27 and 27A, and the opposite bushing halves or segments 15 and 16.

For convenience of shear pin attachment, there is provided internally-threaded, enlarged bores 29 and 30 which receive the enlarged threaded shanks 31 of shear pin 32. The shear pins may have bolt head extremities 33 for tightening purposes.

The construction of the shear pin is seen clearly in FIG. 2. In addition to including the bolt head end, screw head end, or other actuatable exterior means, the same also includes the enlarged shank 31 and also the pin shank 33. The same preferably includes a peripheral shear plane groove 34, which shear plane groove is aligned with the outer surface 35 of bushing halve or segment 15, 16. The end 36 of the shear pin is preferably chamfered for easy insertion in the aligned bores or apertures of bushing segments 15 and 16, hubs 27, 27A, and the central transverse aperture 23 of shaft 21.

The hubs 27, 27A may be secured together by bolt and nut attachments 35 proximate cooperating bosses 36 and 37, on opposite ends of the hub structure. Keys 38 and 39 key both hub sections by their respective slot portions 40 and 41 to key-slots 42 of shaft 21. It is noted that the nut and bolt attachments at 35 may be tightened down securely to present a hard bearing condition as between the key and the hub halves or segments so that the latter will be firmly gripped to the shaft. It is not contemplated that the keys will break or shear; however, in the event such does occur there is a relief afforded as between the shearing blade structure and the shaft.

Of central importance in the invention is the fact of the inclusion of shear pins 32 which provide for a relief or shearing action proximate the shear plane groove 34 of respective ones of the same, so as to provide a slippage of the shearing blade structure about the hub structure. Such shear pin relief may be necessary where there is a hardened object stuck between the respective blade segment 17 and the cutter bar or grate (not shown) with which the shearing mechanism is operatively associated.

A central problem solved by the present invention is one of replacing the key function as to shear pins when a shear pin or shear pin combination is broken. This is easily accomplished in the present invention since, upon shear pin breakage and slippage of the shearing blade halves about the hub, the equipment at the end of the run or at any convenient time, may be simply stopped and the shear pins 32 threaded outwardly as shown in FIG. 3. Subsequently, new shear pins are installed, after index lines 39', 40' are brought into alignment, see below, such that the ends thereof thrust downwardly the broken portions or points P of the old shear pins. Accordingly, the bore 23 and indeed the entire through-bore A may serve as a storage area for broken ends of shear pins as these are thrust down centrally into the structure to be stored in the shaft area proximate bore 23. After five or six shear pin breakages, by way of example, then a simple thin punch can be used to punch out the accumulated broken ends of shear pins which have accumulated at the shaft area, and then new shear pins can be subsequently installed. A new shear pin installation is illustrated in FIG. 4, which takes place after old shear pin removal (FIG. 3).

Index markings 39' and 40' may be provided to align the hubs 27 and 27A relative to the blade, by turning the blade structure relative to the hub until index lines 39' and 40' are brought into alignment structure. Shoulders S, see FIG. 5, are provided the hub segments 27 and 27A to align and retain in position the bushing segments 15, 16. These shoulders likewise will fix in central position the through-apertures 25 of the bushing segments which accommodate the insertion of shear pins 32.

What is provided, therefore, is a shearing blade means having transverse shear pin structure that can be easily removed and replaced in a very simple and inexpensive manner. Indeed, not all of the broken shear pin points need be removed after each overload shearing has occurred; rather the through-bore structure of the shaft, hub and shearing blade means is such as to accommodate a gradual advancement of broken shear points to a position centrally of the structure to be stored actually in the shaft, within aperture 23, as the inner points or extremities of new shear pins are progressively installed. The broken shear pin points need only be removed occasionally, that is when the central shaft cavity or bore becomes filled. At this time it is very easy, with a simple punch-out tool, to push the broken ends of the shear pins completely through the through-bore A such that the pin ends or points drop out. Subsequently, new shear pins are installed once the index markings 39, 40 are aligned.

A further advantage of the split-blade construction, as illustrated and described, is the fact that upon sufficient bearing wear proximate the hub, the central gap of the split blade becomes closed, at which time the user will be aware that new bearing segments must be installed to replace the existing bearing segments 15 and 16.

While particular embodiments of the invention have been shown and described, it will be obvious to those skilled in the art the various changes and modifications which may be made without departing from the essential features of the present invention and, therefore, the aim in the appended claims is to cover all such changes and modifications as fall within the true spirit and scope of the invention.

I claim:

1. A shearing mechanism including, in combination, a shaft having a longitudinal axis of revolvement, a hub annularly disposed upon and keyed to said shaft, said hub including an annular groove, shearing blade means mounted upon said hub and seated at said groove, said blade, hub and shaft having mutually aligned apertures forming a continuous through-bore disposed transversely with respect to said axis of said shaft, and shear pin means disposed through said shearing blade means and penetrating said hub radially inwardly of said groove.

2. Structure according to claim 1 wherein said shear pin includes an annular groove disposed proximate the juncture of said shearing blade means and said hub.

3. Structure according to claim 1 wherein said shearing mechanism includes a second shear pin diametrically opposed to said shear pin means and positioned also within said through bore.

4. Structure according to claim 1 wherein said shear pin means includes a head, an enlarged threaded shank, and a shear pin portion, said shearing blade means including an enlarged threaded counter-bore area threadedly receiving said threaded shank thereat.

5. Structure according to claim 1 wherein said hub comprises a pair of hub-halves, and bolt means joining said hub-halves together, said hub-halves having aligned bearing grooves having upstanding bearing end abutments, and bearing-halves mounted in said grooves and having their ends positioned against said abutments.

6. A shearing mechanism including, in combination, a shaft having a longitudinal axis of revolvement, a hub annularly disposed upon and keyed to said shaft, said hub including an annular peripheral groove, shearing blade means mounted upon said hub and seated in said groove, said shearing blade means being of opposite-half construction having mutually congruent opposite halves, and bolt means securing together said opposite halves; bearing means disposed between said opposite halves and seated in said groove, said shaft, hub and blade means having mutually aligned apertures comprising a through bore disposed transversely with respect to said shaft axis, and shear pin means disposed transversely with respect to said axis of said shaft, through said through bore as defined by said aligned apertures.

7. In combination, a rotatable shaft, revolvement structure disposed upon said shaft, circumscribing the same, said revolvement structure and said shaft including aligned, transverse apertures comprising a through-bore disposed completely through the combination of said revolvement structure and shaft, shear pin means disposed in said through-bore for releasably keying the revolvement of said revolvement structure with the rotation of said shaft, said pin means being threaded into said revolvement structure and being constructed for radial withdrawal therefrom.

8. A shearing mechanism including, in combination, a split shearing blade construction comprising opposite, mutually spaced halves, a journal including a base provided with mutually spaced, aligned bushing grooves, a shaft disposed interior of and keyed for mutual revolvement to said base, bushing segments mounted in said bushing grooves and dimensioned to be held thereby against rotative displacement, said shearing blade construction being mounted upon said bushing segments, said split shearing blade construction being constructed and dimensioned with said bushing segments such that the mutual spacing between said halves of said shearing blade construction closes home at that point at which said bushing segments are worn sufficiently to invite replacement.

9. Structure according to claim 8 wherein said base, bushing segments, shaft, and revolvement structure are provided with aligned apertures comprising a through-bore constituting shear pin means receiving bore and shear pin means, broken-point storage cavity, and shear pin means operably disposed in said through-bore.

* * * * *